March 2, 1926.

H. K. MEACHAM

RIDING TOY

Filed Sept. 8, 1925

1,574,990

Inventor
Haskell K. Meacham.
By Adam C. Fisher.
Attorney

Patented Mar. 2, 1926.

1,574,990

UNITED STATES PATENT OFFICE.

HASKELL K. MEACHAM, OF LONE OAK, TEXAS.

RIDING TOY.

Application filed September 8, 1925. Serial No. 54,899.

*To all whom it may concern:*

Be it known that HASKELL K. MEACHAM, a citizen of the United States, residing at Lone Oak, in the county of Hunt and State of Texas, has invented certain new and useful Improvements in Riding Toys, of which the following is a specification.

This invention is a toy. The object of the invention is to provide the combination of a rotatable, basin-shaped or semi-spherical track or speedway, and a bicycle rider so mounted as to travel around and upon the said track, the movements of the rider being controlled by means of a crank and gear mechanism.

In the drawing—

Figure 1:
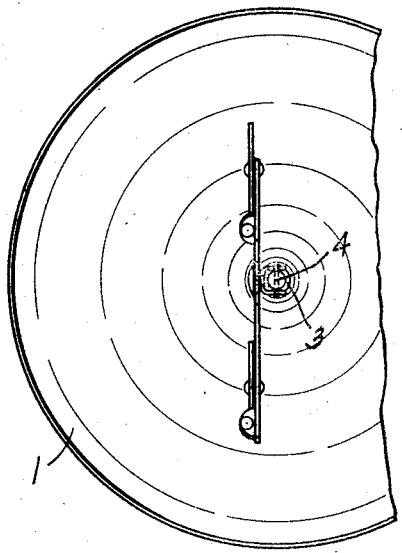
Figure 1 is a top plan view, showing the apparatus in stationary position with the figure rider upright at the bottom of the speedway.
Figure 2:
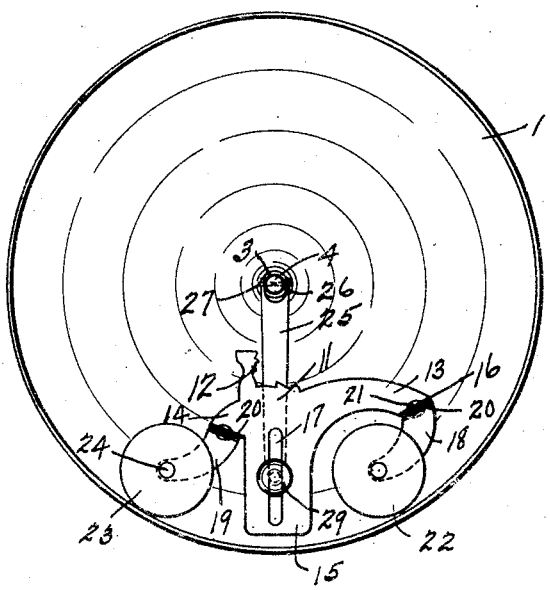
Figure 2 is a top plan view, showing the figure rider as thrown to the upper courses of the speedway through the operation of centrifugal force.
Figure 3:
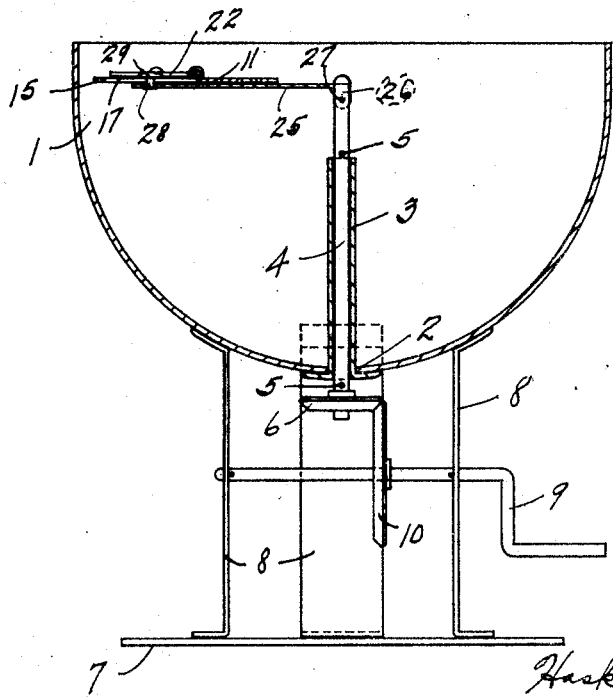
Figure 3 is a vertical, diametrical section.
Figure 4:
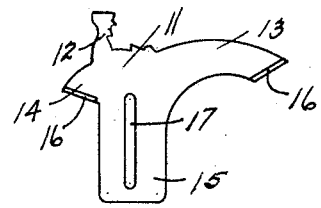
Figure 4 is a detail of the figure rider.
Figure 5:
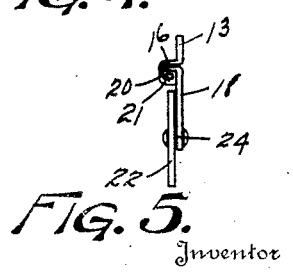
Figure 5 is a detail showing the method of mounting the wheel supports to the bicycle frame.

In carrying out this invention, a semi-spherical speedway in the form of a basin 1 is provided, the same being constructed of sheet metal or any suitable material. A hole 2 is pierced through the center of the bottom of the basin and a shaft sleeve 3 is perpendicularly and rigidly mounted through this hole. An operating shaft 4 is journaled through this sleeve and is held therein by pins 5 passed through the upper and lower ends of the shaft. A bevel pinion gear 6 is rigidly mounted at the lower end of the shaft 4. The basin 1 is supported horizontally upon a base 7 with its open side uppermost by means of uprights 8. A crank shaft 9 is journaled transversely through two of these uprights, and upon this shaft is rigidly mounted a relatively large bevel gear 10 which is placed in mesh with the pinion 6. The rider or traveling element includes a frame 11 formed to include the representation of a rider 12, forwardly and rearwardly extensions 13 and 14 respectively, and a medial extension 15. The extremities of the extensions 13 and 14 are formed angularly with reference to the longitudinal axis of the frame 11 and so that lines extended parallel therewith, cut the said axial line. Lips 16 are formed integrally at the extremities of the extensions 13 and 14 by merely bending said extremities outwardly perpendicularly to the frame 11. An adjustment slot 17 is cut in the extension 15, the same being directed perpendicularly to the longitudinal axis of the frame 11. Front and rear wheel supports 18 and 19 are provided, the same having lips 20 turned sidewise therefrom and set angularly relative thereto, and so adapted to coact with the lips 16 to form a wheel mounting for the device. This is accomplished by passing rivets 21 loosely through the said lips 16 and 20. The supports 18 and 19 are curved backwardly as shown, and front and rear wheels 22 and 23 are journaled on spindles 24 which are rigidly extended from the said supports. A flat driving lever 25 is provided, the same having a fork 26 adapted to embrace the upper end of the shaft 4, to which shaft it is pivotally attached by means of a pin 27 passed horizontally through the fork and through the end of the shaft, whereby the lever 25 is adapted to oscillate vertically. The frame 11 is loosely tied to the lever 25 by means of a rivet 28 passed through the slot 17 and rigidly set in the outer end of the lever 25, the said rivet 28 being provided with a large disk-like head 29 which serves to hold the frame 11 at all times in a position substantially parallel with the plane of the lever 25, while at the same time permitting the necessary freedom of movement to the frame 11 in its sliding action afforded by the slot 17.

The elements of the device being formed and assembled as described, upon the crank 9 being rotated, the figure frame 11 will be gradually carried upwardly over the sides of the basin 1 by centrifugal force. The degree and rapidity of this ascent will, of course, depend upon the speed of the shafts 9 and 4. The crank shaft 9 should be turned so as to cause the frame 11 to travel forwardly, that is, with the wheel 22 preceding the wheel 23. Owing to the backward bending of the supports 18 and 19 and their swiveled and angular connections to the extensions 13 and 14, the said wheels will always drag backwardly and so be held in the plane of the frame 11. The adjustment slot 17 allows the wheels 22 and 23 always to hold contact with the inner surface of the basin 1, through the action of centrifugal force.

While I have herein described a certain specific manner and method of constructing and assembling the elements of my invention, it is understood that I may vary from the same in minor details, not departing from the spirit of my invention, so as best to construct a practical device for the purpose intended, as defined in the appended claims.

I claim:

1. A device of the kind described, comprising a basin supported with its open side uppermost; an operating shaft journaled to rotate in the basin; a driving lever pivoted to the operating shaft so as to oscillate vertically within the basin; a riding element including a frame having a medial slot through which it is slidingly attached to the outer end of the driving lever; wheels pivotally attached at the forward and rear ends of the frame and adapted to operatively impinge and travel over the inner surface of the basin as the operating shaft is rotated; and means for causing the said operating shaft to rotate.

2. A device of the kind described, comprising a basin supported with its open side uppermost; an operating shaft journaled to rotate in the basin; a driving lever pivoted to the operating lever so as to oscillate vertically within the basin; a riding element including a frame having a medial slot therein through which it is slidingly attached to the outer end of the driving lever by means of a rivet passed loosely through the slot and set in the outer side of the lever, the ends of the said frame being cut angularly and the edges thereof being turned up to form lips; front and rear wheel supports having angularly set lips pivotally connected with the lips of the frame and whereby the said wheel supports are given a dragging mounting relative to the forward motion of the riding element; wheels journaled upon the said wheel supports; and means for causing the said driving lever to rotate.

3. A device of the kind described, comprising a semi-spherical basin supported with its open side uppermost, there being a shaft hole through the bottom of the basin; a sleeve mounted vertically within the basin over the shaft hole; an operating shaft journaled through the said sleeve; a driving lever pivoted to the upper end of the shaft and adapted to oscillate vertically within the basin; a riding element slidingly connected at the outer end of the driving lever; wheel supports pivotally connected at the ends of the riding element; wheels rotatively mounted upon the said supports and adapted to travel the inner surface of the basin; and means to cause the said operating shaft to rotate.

In testimony whereof I affix my signature.

HASKELL K. MEACHAM.